United States Patent [19]

Cook

[11] 3,856,242
[45] Dec. 24, 1974

[54] MOUNTING APPARATUS FOR A SURGE VOLTAGE ARRESTER

[75] Inventor: Bernard D. Cook, Pittsfield, Mass.

[73] Assignee: General Electric Company

[22] Filed: Mar. 29, 1973

[21] Appl. No.: 346,130

[52] U.S. Cl................. 248/20, 52/167, 248/358 R, 267/162
[51] Int. Cl............................................. F16f 15/00
[58] Field of Search ....... 248/20, 21, 22, 24, 358 R, 248/25; 188/1 B; 52/167, 573, 98

[56] References Cited
UNITED STATES PATENTS

| | | |
|---|---|---|
| 2,678,796 | 5/1954 | Roy.................................... 248/21 X |
| 3,659,814 | 5/1972 | Rode.................................. 248/23 |
| 3,794,277 | 2/1974 | Smedley et al. ...................... 248/20 |

FOREIGN PATENTS OR APPLICATIONS
1,569,753    6/1969    France.................. 248/21

Primary Examiner—J. Franklin Foss
Attorney, Agent, or Firm—Francis X. Doyle; Volker R. Ulbrich

[57] ABSTRACT

A mounting apparatus for a surge voltage arrester which immunizes the arrester from destruction resulting from high energy shock such as that from an earthquake. The mounting apparatus, comprised of disc springs and washers, provides a flexible connection between the arrester and a mounting body to reduce the effect of shock on the arrester itself and to dissipate the shock energy imparted to the arrester.

2 Claims, 8 Drawing Figures

3,856,242

MOUNTING APPARATUS FOR A SURGE VOLTAGE ARRESTER

BACKGROUND OF THE INVENTION

1. Field of the Invention

This invention relates to surge voltage arresters, and more particularly to mounting apparatus for surge voltage arresters.

2. Description of Prior Art

Recent earthquakes have focused attention on the ability of electrical distribution equipment to withstand high energy shock without destructing. In some previous instances, the inability to withstand earthquake shock has caused electrical equipment to fail which resulted in unnecessary major electrical power outages over large population areas. Following a natural disaster, electrical power is absolutely necessary for health and sanitation purposes of the public, and thus the need is apparent for apparatus to make electrical distribution equipment immune or resistant to damage under earthquake conditions.

Electrical distribution equipment constructed from metal is almost entirely immune to earthquake shock, but other equipment constructed of less substantial material is susceptible to destruction. A surge voltage arrester having an outer ceramic housing is an example of such latter piece of equipment.

One approach to avoiding destruction of a surge voltage arrester is to attach it to the earth or a mounting body by means of a flexible mounting apparatus. However, if the flexible mounting apparatus allows the surge voltage arrester to vibrate at a frequency similar to the frequency of the earthquake shock wave, a substantial danger exists that the arrester will destruct due to vibrations at the natural resonance frequency of the arrester about its mounting apparatus. Measurements have indicated that earthquake shock energy causes the most adverse vibrations in the range of 2½ to 5 hz. Consequently, the flexible mounting apparatus must not provide a natural resonance frequency for the surge voltage arrester in the range of the most adverse shock-wave frequency.

It is also desirable that the mounting apparatus dissipate the shock energy imparted to the arrester as rapidly as possible because unchecked vibrations increase the probability of damage. Vibrations and movements of the arrester can be caused to decay and rapidly cease if a damping arrangement is employed. A damping arrangement should dissipate the shock energy rapidly so that the oscillations will rapidly cease as a result of the energy dissipation.

Surge voltage arresters are typically located in open environment and are susceptible to weathering conditions. In this environment the mounting apparatus must have the capability of withstanding weathering conditions over extended periods of time while not sacrificing durability and reliability of performance. Further, the mounting apparatus should be as economical as possible to construct, as well as of a design that allows it to be interchangeably used and adapted to all sizes and weights of surge voltage arresters.

The present invention, a mounting apparatus for a surge voltage arrester, meets these requirements. The mounting apparatus allows the surge voltage arrester to vibrate at a frequency substantially less than the most adverse natural frequency of an earthquake and thereby eliminates the possibility of destruction due to the effect of resonant frequency phenomena. The mounting apparatus provides high damping and dissipates the shock energy rapidly to cause the vibrations to decay. The mounting apparatus is constructed of standard, inexpensive, readily available metal materials and is reliable and durable over an extended period of time under conditions of a natural environment. The mounting apparatus requires no modifications of the standard surge voltage arrester and is of a design which may be interchangeably adapted to all sizes and weights of arresters. These foregoing factors make the present mounting apparatus an effective and economical means for preventing destruction of or damage to a surge voltage arrester subject to earthquake shock conditions.

SUMMARY OF THE INVENTION

It is an object of this invention to provide a mounting apparatus for a surge voltage arrester which makes the arrester immune or resistant to destruction from high energy shock of an earthquake.

It is another object of this invention to provide a mounting apparatus for a surge voltage arrester which allows the arrester to vibrate under the influence of earthquake shock energy at a frequency much less than the most adverse frequency of the earthquake.

It is a further object of this invention to provide a mounting apparatus for a surge voltage arrester in which the frequencies imparted to the arrester are caused to damp or decrease rapidly.

It is a further object of this invention to provide a mounting apparatus for a surge voltage arrester which is durable and reliable over an extended period of time in a natural environment, as well as economical to manufacture and to use with a conventional surge voltage arrester.

To achieve these and other objects, the preferred embodiment of the mounting apparatus employs first and second attachment members for flexibly connecting the arrester with a mounting body. The first and second attachment members include deflectable spring means for changing dimensions under the influence of shock energy and energy reservoir means for receiving energy from the deflectable spring means when the deflectable spring means change dimensions. The deflectable spring means comprise disc springs and the energy reservoir means comprise washers, and the disc springs and washers are arranged in nests connected in series. Each nest in the preferred embodiment comprises a washer and at least one disc spring on each side of the washer and the disc springs having concave surfaces facing the washer. In this arrangement, energy imparted to the mounting body causes the disc springs to change dimensions thereby creating friction by movement against the washers to dissipate the shock energy imparted to the mounting body. A further embodiment of the mounting apparatus includes a means for providing a limiting connection between the arrester and the mounting body when shock energy less than a certain magnitude is applied to the mounting body or the arrester and for eliminating the limiting connection when the shock energy greater than the certain magnitude is applied to the mounting body. This arrangement prevents the arrester from moving unnecessarily under shock conditions, such as wind or the like, less than those of an earthquake.

BRIEF DESCRIPTION OF THE DRAWINGS

A more complete understanding of the invention may be had by referring to the accompanying Detailed Description of the Invention and the drawings in which.

DETAILED DESCRIPTION OF THE INVENTION

Figure 1:
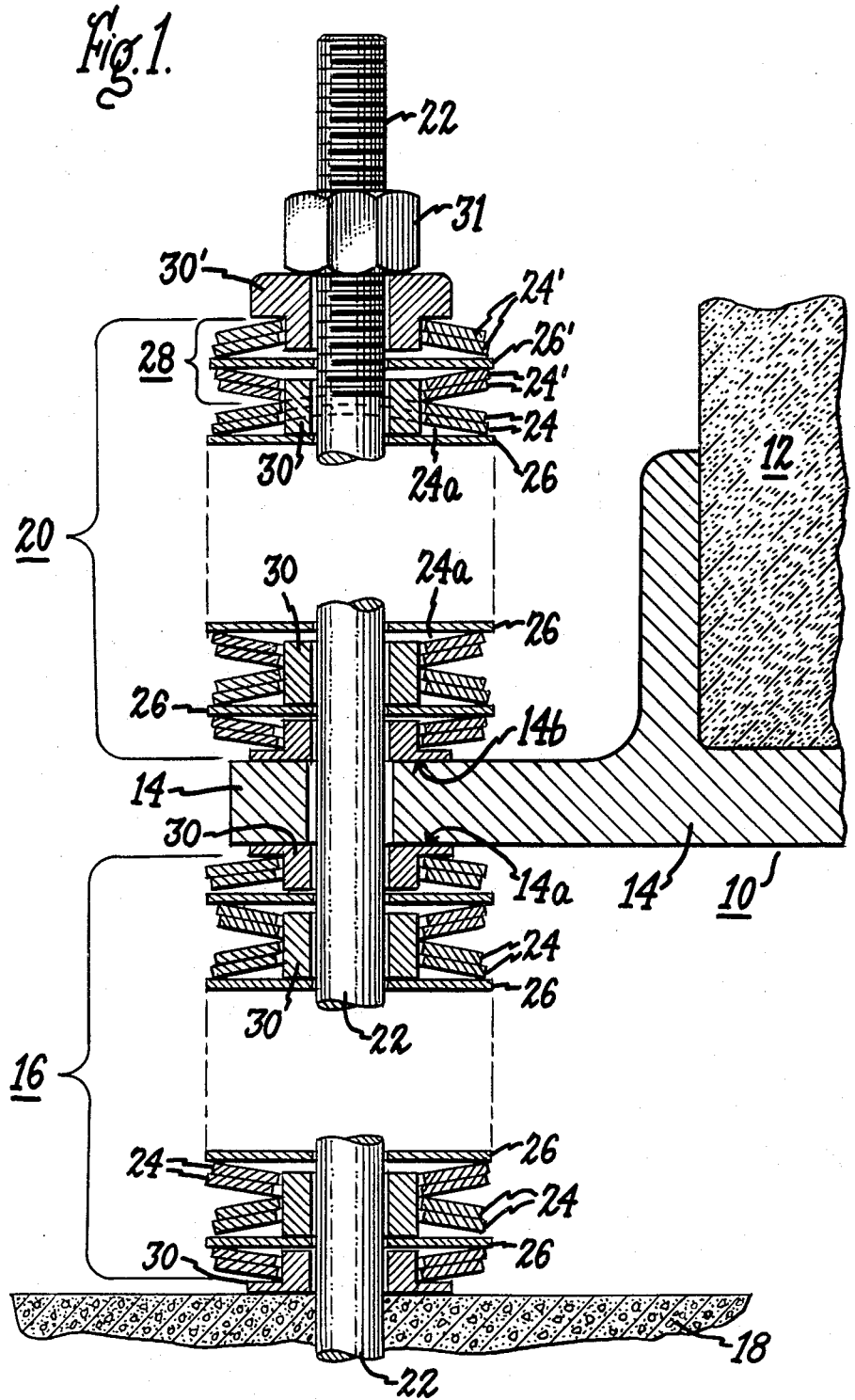
FIG. 1 is a sectional view of a mounting apparatus incorporating this invention.

One embodiment of the invention employing a surge voltage arrester in combination with first and second attachment members is illustrated in FIG. 1. The surge voltage arrester, generally illustrated at 10, has a generally elongated ceramic housing 12 and an attached supporting foot 14, as well as all other members and components employed in the typical surge voltage arrester well known in the art. The first attachment or resilient member 16 flexibly connects one side 14a of the supporting foot 14 with a mounting body 18. The second attachment member 20 flexibly connects another side 14b of the supporting foot 14 and a bolt or an extension 22 from the mounting body 18. The mounting body 18 is a substantial material such as concrete or heavy metal suitable for securing the surge voltage arrester.

The flexible connection provided by the first and second attachment members results from the employment of deflectable spring means in these attachment members. The deflectable spring means may comprise disc springs, a few disc springs being illustratively indicated at 24. Disc springs, *per se*, are well known in the art and are commonly called Belleville springs. As is well known each disc spring has a concave surface. The concave surface is that surface which appears to be indented or cupped when viewing the disc spring, and the concave surface of a few of the disc springs is illustrated at 24a. As is also well known, the flexibility of a disc spring results from deflectable characteristics arising from its ability to bend or compress in a manner in which the concave face tends to flatten out or become less concave and then springs back to its original shape. Thus, under the influence of a compressing force or other form of energy, the disc spring changes dimensions and absorbs some of the applied energy.

The first and second attachment members additionally include energy reservoir means such as washers 26. The energy reservoir means or washers receive energy from the deflectable spring means when the deflectible spring means change dimensions, as is more fully described under the conditions of operation described below.

The disc springs 24 and the washers 26 of the first and second attachment members are arranged in the form of a plurality of disc spring washer nests connected in series. One such disc spring-washer nest is illustratively indicated at 28. The nest 28 and every other similar nest in this embodiment comprises a washer 26' and at least one disc spring 24' on each side of the washer. In each nest, the concave surfaces of the disc springs are arranged so that the concave surfaces 24a face the washer. Although each disc spring-washer nest may comprise at least one disc spring on each side of the washer, the particular disc spring-washer nest 28 and the other disc spring-washer nests in FIG. 1 illustrate two disc springs on each side of each washer. Sleeves, a few illustrated at 30, may be employed to center the disc springs 24 around the extension or bolt 22 and to hold the disc springs in their proper positions. Obviously, bolt 22 may be secured to body 18 in any desired manner. Sleeve washer 30' and nut 31 are shown securing resilient members 16 and 20.

The operation of the first and second attachment members in providing a flexible connection will now be described. Should a large amount of shock energy such as that from an earthquake be imparted to the mounting body 18 of the surge voltage arrester 10, this energy will be transferred to the disc springs of the first and second attachment members, 16 and 20, respectively. The influence of this shock energy causes the disc springs to compress, spring back, and change dimensions as previously described, and thereby absorb some of the shock energy imparted to the mounting body by the earthquake. As the disc springs change dimensions and absorb energy, two effects result: first, a flexible connection is provided for the arrester, and the attached supporting foot 14 is allowed to move freely in a generally vertical direction about the extension 22 from the mounting body 18; and second, the outside edges of the disc springs move laterally and scrape against the washers to transmit some of the energy absorbed to the washers in the form of heat due to friction. The flexible connection allows the surge voltage arrester to move freely and oscillate in relation to the mounting body 18. The flexible connection eliminates the need for the arrester itself to withstand all of the shock of an earthquake. Furthermore, the mounting apparatus allows the arrester to vibrate at a frequency much less than the most adverse frequency prevalent from an earthquake, thereby eliminating the possibility that self-destructing, resonant frequencies will destroy the arrester. For example, a surge voltage arrester having five sections for a total length of about twenty-five feet and having a weight exceeding 4,000 pounds was found to vibrate at 0.8 hz., well below the most adverse earthquake frequency range of 2.5 to 5 hz. In addition, the energy transmitted from the disc springs to the washers has the effect of damping or causing the oscillations of the arrester to decrease rapidly. Test results show that the damping factor increases to about twice the value for an arrester not employing this particular mounting apparatus. Moreover, this mounting apparatus requires no modification of the conventional surge voltage arrester other than the addition of the mounting apparatus to prevent the destruction of the arrester during earthquakes.

In summary, it can readily be seen that the disc springs and washers provide a flexible mounting apparatus for a surge voltage arrester which prevents destruction of the arrester when it is subjected to shock energy from an earthquake, and causes the movement or oscillation of the arrester to be rapidly damped. These advantages are provided through the use of conventional disc springs and washers which are relatively inexpensive to manufacture, durable under weathering conditions, and reliable over an extended period of time.

Figure 2:
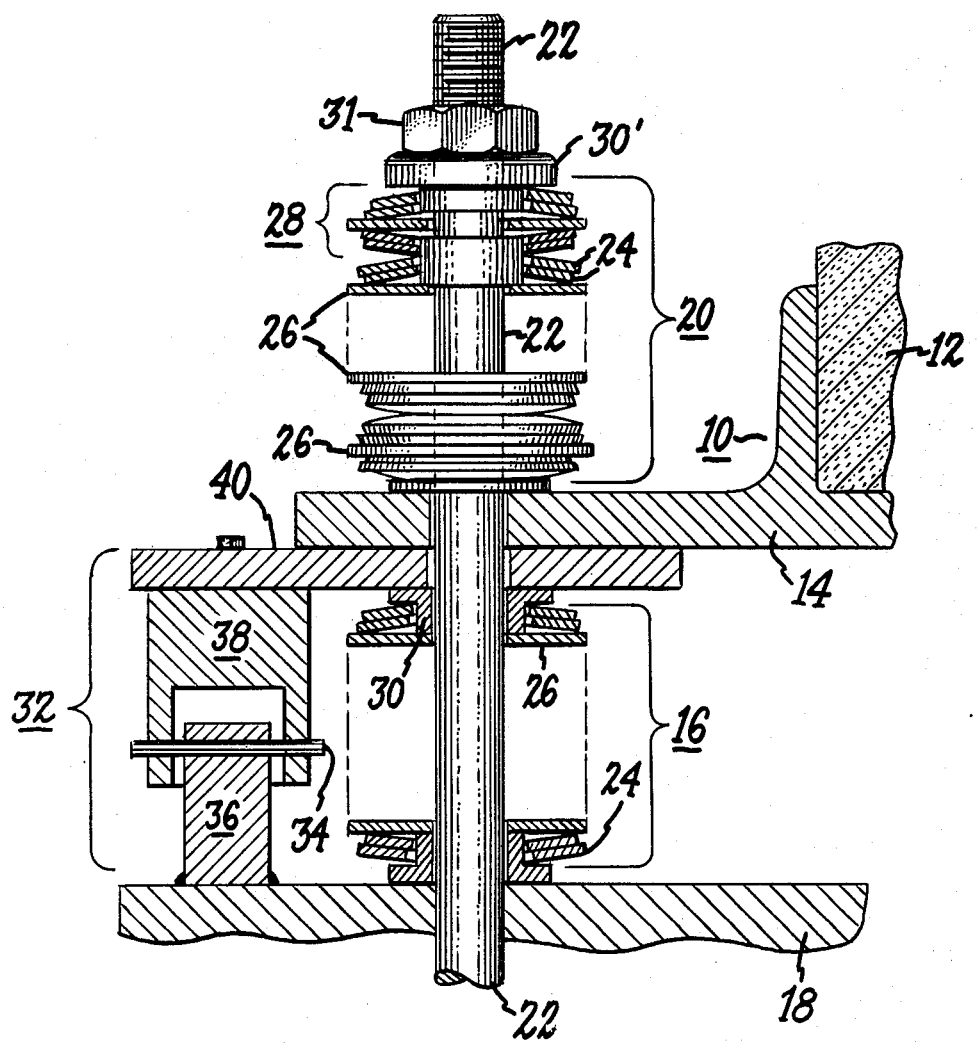
FIG. 2 is a sectional view of a further embodiment of the mounting apparatus.

FIG. 2 illustrates another embodiment of the invention in which a surge voltage arrester is in combination with a shock and energy absorbing apparatus. Many of the same reference numerals previously used are also used in FIG. 2. A means 32 for providing a limiting connection between the supporting foot 14 and the mounting body 18 when shock energy less than a predetermined magnitude is applied to the arrester or its mounting and for eliminating the limiting connection when shock energy greater than a predetermined magnitude is applied to the arrester or its mounting is illustrated. The means 32 for providing a limiting connection and for eliminating the limiting connection may include a frangible element such as a shear pin 34. The shear pin 34 mechanically connects members 36 and 38. Member 36 is rigidly connected to the mounting body 18, and an extension 40 may be provided from the supporting foot 14 for the rigid attachment of member 38. This arrangement provides a limiting connection between supporting foot 14 and mounting body 18. The limiting connection prevents any substantial movement of the supporting foot 14 relative to the mounting body 18 under conditions when energy less than a predetermined magnitude is applied to mounting body 18 or to the surge voltage arrester 10. The magnitude of energy necessary to eliminate the limiting connection is that amount of predetermined energy necessary to shear or sever the pin 34. After the pin 34 shears, the connection which initially limited movement between members 36 and 38 and hence between the supporting foot 14 and the mounting body 18 is eliminated, and the supporting foot is free to move relative to the mounting body 18.

Figure 2A:
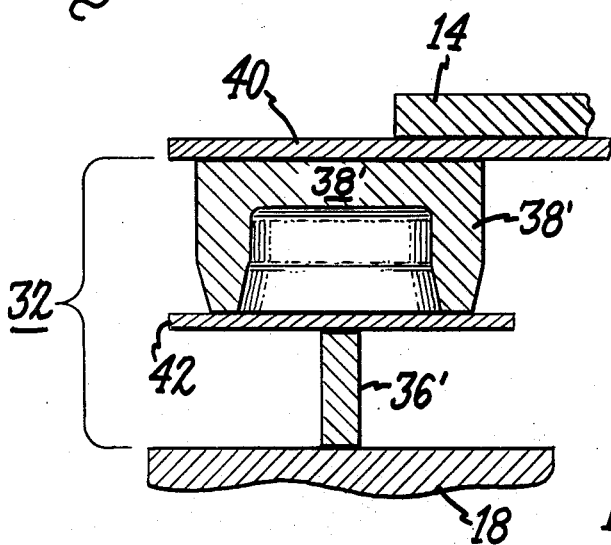
FIGS. 2a and 2b are alternative embodiments of FIG. 2.
Figure 2C:
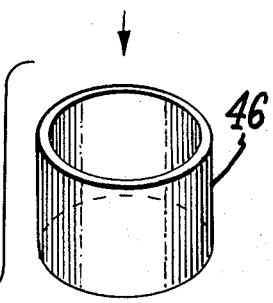
FIGS. 2c and 2d are employed to explain the construction and operation of the alternative embodiment of FIG. 2b.
Figure 2B:
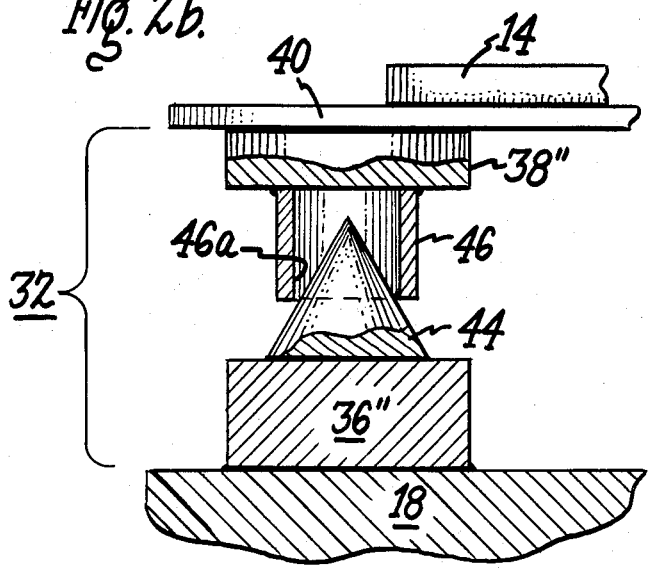
Figure 2D:
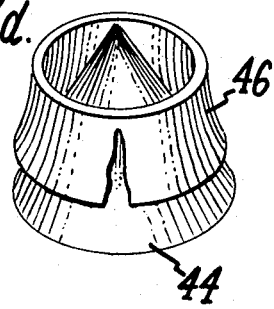

Alternative embodiments of the above described means 32 for providing a limiting connection and for eliminating the limiting connection are shown in FIGS. 2a and 2b. In FIG. 2a, a deformable element such as a bendable metal piece 42 is placed between members 36' and 38'. The bendable metal piece 42 prevents relative movement between the supporting foot 14 and the mounting body 18 when energy less than a predetermined magnitude is applied to the arrester 10 or body 18, but upon application of energy greater than that predetermined magnitude required to bend or deform the element 42, the initial limiting connection is eliminated due to the bending of the bendable metal piece 42. The supporting foot 14 is then free to move relative to the mounting body 18. In FIG. 2b a cone 44 and a hollow cylinder 46 are connected by members 36'' and 38'' between the supporting foot 14 and the mounting body 18. The cone and hollow cylinder are best seen in their separated form in FIG. 2c. Referring back to FIG. 2b, the connection between the hollow cylinder and the cone is formed by an inside surface 46a of the hollow cylinder contacting the curved surface of the cone 44. This provides a limiting connection between the supporting foot 14 and the mounting body 18 when the energy of less than a predetermined magnitude is applied to the surge voltage arrester 10 or mounting 18, but upon the application of energy greater than the predetermined magnitude, the hollow cylinder 46 is forced down over the cone 44, as is illustrated in FIG. 2d. The hollow cylinder is caused to expand and change dimensions, and the initial limiting connection is eliminated to allow relative movement between the supporting foot 14 and the mounting body 18.

Any of the previously described embodiments of the means 32 for providing a limiting connection and for eliminating the limiting connection does not sacrifice the performance of the mounting apparatus. The means for providing and eliminating the limiting connection merely acts to prevent the arrester from unnecessary movement under conditions not comparable to earthquake conditions, such as, for example, movement which might otherwise be caused by wind.

Figure 3:
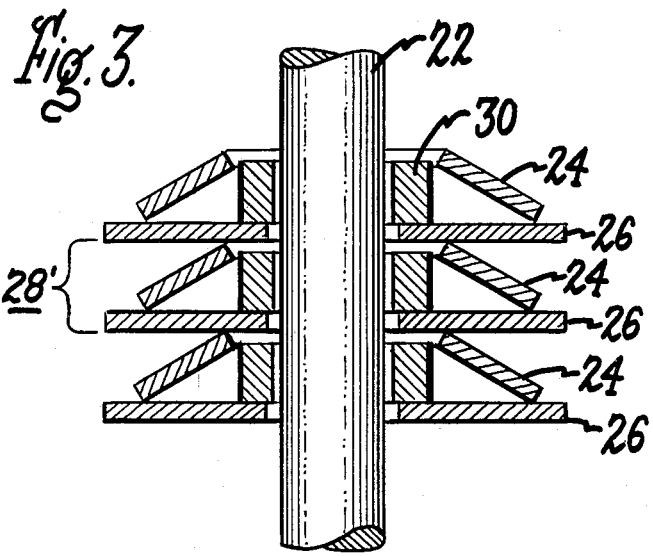
FIG. 3 shows an alternate embodiment of the flexible attachment members of this invention.

FIG. 3 shows an alternate embodiment of the attachment members 16 and 20. As shown in FIG. 3, only one disc spring 24 is applied to each washer 26. Thus, as can be readily seen, the nest 28' comprises a washer 26 and at least one disc spring 24 having its concave surface contacting one side of the washer 26. The use of a disc spring 24 acting on only one side of each washer 26 does not provide as efficient operation as the preferred embodiment, but such a combination will provide the desired shock protection to the arrester.

Figure 4:
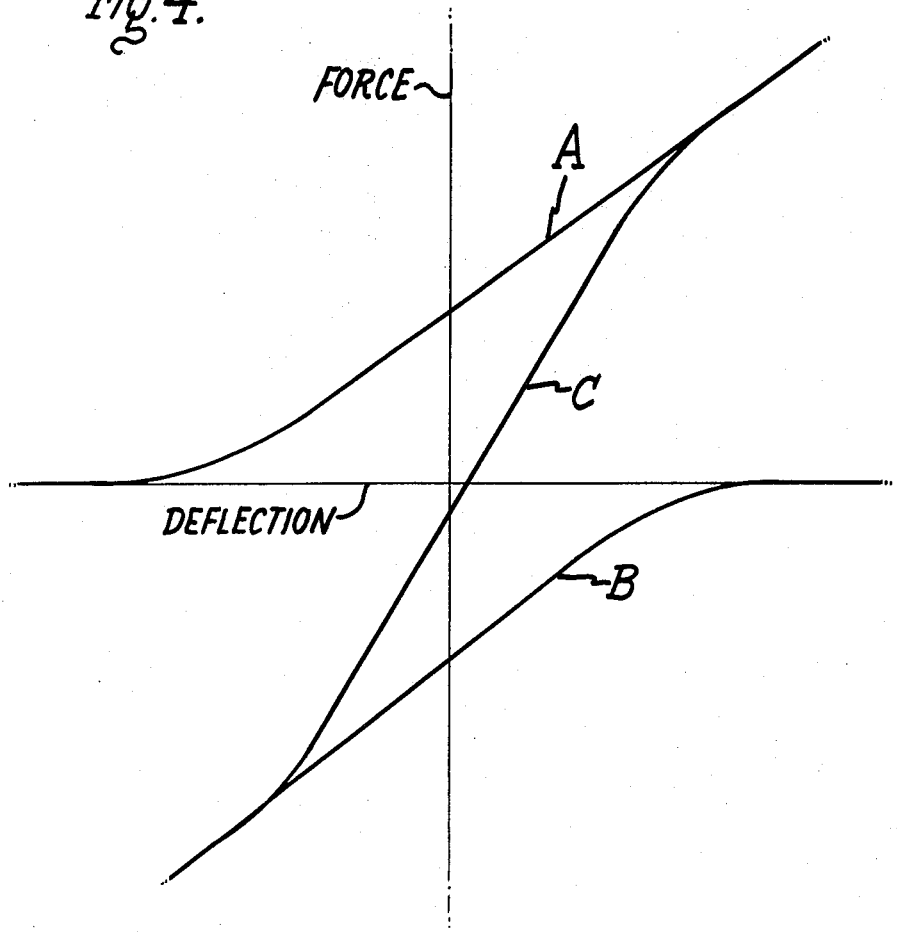
FIG. 4 is a graph showing the force-deflection curves of each attachment and of the assembly.

FIG. 4 is a graph of force-deflection curves of the assembly of FIG. 1. Curve A is the characteristic force deflection curve of the upper attachment 20 of FIG. 1. As shown, Curve A is displaced upwardly on the force line by the amount of the preload on the attachment 20. Curve B is the force-deflection curve of the lower attachment 16. This curve is shown as displaced downwardly on the force line by the weight of the arrester and the preload on this attachment 16. The force-deflection curve of the total assembly is shown as Curve C. This curve is displaced downwardly by the weight of the arrester. It should be noted that should the arrester be moved, such as by swaying, so as to disassociate the upper attachment 20 or lower attachment 16 from the foot 14, no sudden impact would be applied to the arrester. As is apparent from FIG. 4, the Curve C of the assembly smoothly converges with Curve A and Curve B. This clearly shows that no impact is applied to the arrester in the event of overtravel with respect to foot 14 and upper attachment 20 or lower attachment 16.

Although a number of embodiments of the mounting apparatus have been shown and described, those skilled in the art will perceive changes and modifications without departing from the invention. Therefore, it is intended by the appended claims to cover all such changes modifications as fall within the true spirit and scope of the invention.

What is claimed as new and desired to be secured by Letters Patent of the United States is:

1. In combination with a surge voltage arrester having a generally elongated ceramic housing and an attached supporting foot, a shock and energy absorbing apparatus comprising:
  a. a resilient member for flexibly connecting the supporting foot and a mounting body, the resilient member having the capability of changing dimensions and absorbing energy under influence of shock energy; and
  b. means including a bendable metal plate for providing a limiting connection between the supporting foot and the mounting body when shock energy less than a predetermined magnitude is applied to said combination and for eliminating the limiting connection when shock energy greater than the predetermined magnitude is applied to said combination.

2. In combination with a surge voltage arrester having a generally elongated ceramic housing and an attached supporting foot, a shock and energy absorbing apparatus comprising:
 a. a resilient member for flexibly connecting the supporting foot and mounting body, the resilient member having the capability of changing dimensions and absorbing energy under influence of shock energy; and
 b. means for providing a limiting connection between the supporting foot and the mounting body when shock energy less than a predetermined magnitude is applied to said combination and for eliminating the limiting connection when shock energy greater than the predetermined magnitude is applied to said combination, wherein said means includes a cone and a hollow cylinder interconnected between the mounting body and the supporting foot, the hollow cylinder having an inside surface contacting a curved surface of the cone, whereby shock energy greater than a predetermined magnitude causes the hollow cylinder to change dimensions and move relative to the cone.

* * * * *